United States Patent [19]

Takahashi et al.

[11] 3,933,668

[45] Jan. 20, 1976

[54] INTERGRANULAR INSULATION TYPE POLYCRYSTALLINE CERAMIC SEMICONDUCTIVE COMPOSITION

[75] Inventors: Yasunori Takahashi, Tokyo; Nobutatsu Yamaoka, Takasaki; Yoshifumi Yamaoka, Haruna; Shuichi Kakubari, Shibukawa, all of Japan

[73] Assignees: Sony Corporation; Taiyo Yuden Co., Ltd., both of Japan

[22] Filed: July 10, 1974

[21] Appl. No.: 487,306

[30] Foreign Application Priority Data
July 16, 1973 Japan.................................. 48-79284
July 16, 1973 Japan.................................. 48-79285

[52] U.S. Cl................................. 252/63.5; 106/73.3
[51] Int. Cl.².............................................. H01B 3/02
[58] Field of Search............... 106/73.31, 73.3, 39.8; 252/63.5; 357/10

[56] References Cited
UNITED STATES PATENTS

| | | | |
|---|---|---|---|
| 2,525,627 | 10/1950 | Wainer............................... | 106/73.3 |
| 2,829,979 | 4/1958 | Calis.................................. | 252/63.5 |
| 3,028,248 | 4/1962 | Glaister............................. | 357/10 |
| 3,033,907 | 5/1962 | Rue.................................... | 106/73.3 |
| 3,074,804 | 1/1963 | Planer et al....................... | 357/10 |
| 3,080,239 | 3/1963 | Zlotnick............................. | 106/73.31 |
| 3,352,697 | 11/1967 | Fujiware et al................... | 106/73.3 |

*Primary Examiner*—Leland A. Sebastian
*Assistant Examiner*—Josephine Lloyd
*Attorney, Agent, or Firm*—Hill, Gross, Simpson, Van Santen, Steadman, Chiara & Simpson

[57] ABSTRACT

An intergranular insulation type semiconductive ceramic composition comprising a major proportion of strontium titanate ($SrTiO_3$), a minor amount of niobium oxide ($Nb_2O_5$) or tantalum oxide ($Ta_2O_5$), a minor amount of either germanium oxide ($GeO_2$) or zinc oxide (ZnO) and having diffused therein either bismuth oxide ($Bi_2O_3$) or a mixture of bismuth oxide, lead oxide (PbO) and boric oxide ($B_2O_3$). The material is especially useful as a capacitor.

5 Claims, 1 Drawing Figure

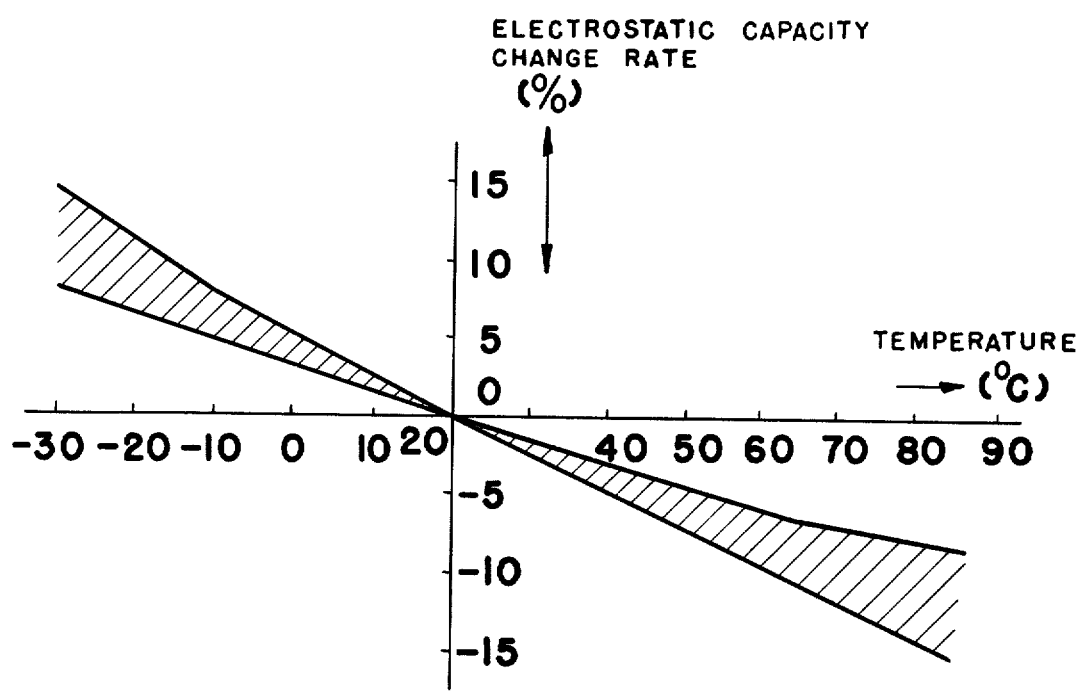

INTERGRANULAR INSULATION TYPE POLYCRYSTALLINE CERAMIC SEMICONDUCTIVE COMPOSITION

BACKGROUND OF THE INVENTION

1. Field of the Invention

This invention is in the field of ceramic compositions having high dielectric constants and including strontium titanate as the major ingredient, the crystalline lattice of the strontium titanate being substituted by oxides of niobium, tantalum, germanium, or zinc and having insulated grain boundaries through the diffusion therein of either bismuth oxide or a combination of bismuth oxide, lead oxide, and boric oxide.

2. Description of the Prior Art

It has heretofore been known that it is possible to produce a ceramic dielectric with a large effect dielectric constant by insulating the grain boundaries of a conventional ceramic semiconductor. This type of structure is generally referred to as a "boundary layer type capacitor." A ceramic semiconductor of the barium titanate series, for example, an effective dielectric constant of 50,000 to 70,000 can be obtained, with an insulation property such that its withstand voltage is 800 volts per millimeter and its insulation resistance is about $2 \times 10^{11}$ ohm/cm. The difficulty with this type of capacitor, however, is that it evidences a capacity change of about $+40°$ from its value of 20° by a change in temperature to the range of 30° to 85°C. Furthermore, its loss factor is comparatively large, being at about 5 to 10%, so that its usefulness as a capacitor is restricted.

It has also been known that strontium titanate can be used as a principal component of a capacitor, when combined with manganese oxide and silica, and the resultant mixture is sintered in an argon atmosphere to obtain a ceramic semiconductor. This structure, with or without an additional manganese oxide coating, can be subjected to a secondary sintering in an oxidizing atmosphere to cause the grain boundaries to become insulated. The product thus obtained is as low as 15% in electrostatic capacity change in the range of 30° to 85°C, and its loss factor becomes as low as 2 to 5% so that these properties are better than the corresponding properties of a barium titanate type. However, the effective dielectric constant at a withstand voltage of 1,800 to 1,000 volts per millimeter is only about 20,000 to 35,000, which is very low.

SUMMARY OF THE INVENTION

The present invention provides an intergranular insulation type semiconductive ceramic composition in which the principal ingredient (at least 50%) is strontium titanate to which may be added either niobium oxide ($Nb_2O_5$) or tantalum oxide ($Ta_2O_5$) and either germanium oxide ($GeO_2$) or zinc oxide (ZnO). The resulting mixture is molded and sintered so as to obtain a polycrystalline ceramic semiconductor. The grain boundaries are insulated by diffusion therein of bismuth oxide ($Bi_2O_3$) or a composition containing bismuth oxide, lead monoxide (PbO) and boron oxide ($B_2O_3$).

The change in electrostatic capacity with temperature of the new compositions is maintained within plus or minus 15%, together with an improvement in the withstand voltage and the loss factor. The effective dielectric constant is similar to that obtained where a barium titanate series semiconductor is used.

BRIEF DESCRIPTION OF THE DRAWING

The single FIGURE of the drawing is a graph illustrating the change of electrostatic capacity with temperature for the capacitors of the present invention.

DESCRIPTION OF THE PREFERRED EMBODIMENTS

The following examples illustrate the variations which are possible in proceeding in accordance with the present invention.

EXAMPLE 1

Powdered strontium titanate, niobium oxide and zinc oxide were combined in the proportions shown in Table 1, mixed and pulverized in accordance with the usual ceramic manufacturing method. Then each composition was combined with a binder such as polyvinyl alcohol and pressed and molded into the form of a disc. Each disc was sintered at 1350°C to 1480°C in a slightly reducing atmosphere containing 99% nitrogen and 1% hydrogen so as to produce a ceramic semiconductor sample of about 8 millimeters in diameter and 0.4 millimeters in thickness. These discs were then coated on their major surfaces with three milligrams of bismuth oxide powder as a diffusion agent and sintered at 1,300°C for 2 hours in an oxidizing atmosphere so as to diffuse the agent into the grain boundaries of the sample for grain boundary insulation. This sample was formed into a capacitor by applying silver electrodes and baking them to opposite surfaces of the discs.

The electrical properties obtained for each of the capacitors are described in Table 1. The measurement of dielectric constant and the loss factor were made at 1 kilohertz and the insulation resistance value was obtained at 1 minute after applying a 50 volt DC potential. The measurement as to dielectric breakdown voltage was made with a direct current voltage.

TABLE 1

| Sample No. | Weight ratio of each component (%) | | | $\epsilon$ | $\tan\delta(\%)$ | Electric Properties Insulation resistance (MΩ cm) | Breakdown voltage (V/mm) |
|---|---|---|---|---|---|---|---|
| | $SrTiO_3$ | $Nb_2O_5$ | $GeO_2$ | | | | |
| 1 | 90.68 | 5.32 | 4.00 | $51 \times 10^3$ | 0.8 | $17 \times 10^4$ | 1500 |
| 2 | 95.93 | 0.07 | 4.00 | $54 \times 10^3$ | 0.6 | $14 \times 10^4$ | 1300 |
| 3 | 99.88 | 0.07 | 0.05 | $58 \times 10^3$ | 0.6 | $14 \times 10^4$ | 1300 |
| 4 | 94.63 | 5.32 | 0.05 | $57 \times 10^3$ | 0.7 | $16 \times 10^4$ | 1400 |
| 5 | 93.40 | 2.80 | 3.80 | $59 \times 10^3$ | 0.7 | $14 \times 10^4$ | 1400 |
| 6 | 98.03 | 1.47 | 0.50 | $60 \times 10^3$ | 0.6 | $14 \times 10^4$ | 1400 |
| 7 | 97.47 | 0.53 | 2.00 | $63 \times 10^3$ | 0.6 | $12 \times 10^4$ | 1300 |
| 8 | 97.67 | 1.33 | 1.00 | $65 \times 10^3$ | 0.6 | $14 \times 10^4$ | 1300 |
| 9 | 93.19 | 4.80 | 2.01 | $62 \times 10^3$ | 0.7 | $14 \times 10^4$ | 1300 |
| 10 | 89.68 | 5.32 | 5.00 | $28 \times 10^3$ | 1.5 | $5 \times 10^4$ | 400 |
| 11 | 89.20 | 6.80 | 4.00 | $25 \times 10^3$ | 1.1 | $11 \times 10^4$ | 700 |
| 12 | 95.97 | 0.03 | 4.00 | $40 \times 10^3$ | 0.6 | $13 \times 10^4$ | 1300 |

TABLE 1-continued

| Sample No. | Weight ratio of each component (%) | | | $\epsilon$ | tan$\delta$(%) | Electric Properties Insulation resistance (M$\Omega$ cm) | Breakdown voltage (V/mm) |
|---|---|---|---|---|---|---|---|
| | $SrTiO_3$ | $Nb_2O_5$ | $GeO_2$ | | | | |
| 13 | 91.20 | 6.80 | 2.00 | $30\times10^3$ | 0.9 | $13\times10^4$ | 1300 |
| 14 | 98.02 | 0.03 | 1.95 | $39\times10^3$ | 0.7 | $12\times10^4$ | 1100 |
| 15 | 99.91 | 0.04 | 0.05 | $34\times10^3$ | 0.8 | $11\times10^4$ | 700 |
| 16 | 92.30 | 7.65 | 0.05 | $34\times10^3$ | 0.8 | $16\times10^4$ | 1400 |
| 17 | 94.66 | 5.32 | 0.02 | $41\times10^3$ | 0.7 | $16\times10^4$ | 1500 |

From this table, it will be seen that sample numbers 1 to 9 exhibited properties such that the loss factor was below 0.8%, the effective dielectric constant was 51,000 to 65,000, the insulation resistance is 120,000 to 170,000 megohm centimeters, and the breakdown voltage was 1,300 to 1,500 volts per millimeter. Additionally, it was found that the electrostatic capacity change rate in relation to temperature falls only about 9% in a generally linear fashion, as shown in the drawing.

It is clear from the above that as compared with typical grain boundary insulation type capacitors, the electrical properties of the capacitor of the present invention are clearly superior.

The samples numbered 10 to 17 were not particularly suitable because of their relatively low dielectric constant. Accordingly, with niobium oxide and germanium oxide compounded with the strontium titanate of the ranges of the three should be as follows:

| $SrTiO_3$ | 90.68 to 99.88 weight % |
| $Nb_2O_3$ | 0.07 to 5.32 weight % |
| $GeO_2$ | 0.05 to 4.00 weight % |

It is believed that the $Nb_2O_3$ replaces the atoms of $SrTiO_3$ crystals so as to make the $SrTiO_3$ semiconductive and thereby form a so-called valency control type semiconductor. It is also believed that the $GeO_2$ exists mainly in the grain boundary layer of the crystals and has a tendency to increase the grain diameter or size of the semiconductor crystals.

At the secondary sintering for diffusion, bismuth oxide combines with the $GeO_2$ already present in the grain boundary layer to provide a uniform insulation layer having small pin holes. It was observed through an electron microscope that the crystal grain diameter is larger than that of a conventional strontium titanate semiconductor. If the grain diameter becomes larger, the effective dielectric constant is increased because the insulation layer of the grain boundaries becomes thin for the number of grains connected in series becomes smaller. Thus, the uniform grain boundary insulation layer is apparently obtained, and therefore, the insulation resistance value and the loss factor can be maintained at appropriate values even when the layer is thin.

EXAMPLE 2

A semiconductor is made up as in example 1 using the following ingredients:

| strontium titanate | 97.67 weight % |
| niobium oxide | 1.33 weight % |
| germanium dioxide | 1.00 weight % |

These semiconductive discs thus obtained were coated on their major surfaces with three milligrams of diffusion agents containing lead oxide, bismuth oxide and boric oxide, in the concentrations shown in Table 2. Each sample was sintered at 1,100°C for 2 hours in an oxidizing atmosphere so as to diffuse the agent into the grain boundary as a sample to provide an intergranular insulation therefor. Silver electrodes were baked onto opposite main surfaces of the discs to form the sample into a capacitor. The electrical properties of such capacitors are also shown in Table 2.

Table 2

| Sample No. | Weight ratio of each component (%) | | | $\epsilon$ | tan $\delta$ (%) | Electric Properties Insulation Resistance (M$\Omega$.cm) | Breakdown Voltage (V/mm) |
|---|---|---|---|---|---|---|---|
| | PbO | $Bi_2O_3$ | $B_2O_3$ | | | | |
| 18 | 50 | 45 | 5 | $75\times10^3$ | 0.35 | $35\times10^4$ | 1800 |
| 19 | 5 | 95 | 0 | $63\times10^3$ | 1.2 | $8\times10^4$ | 1100 |
| 20 | 45 | 54 | 1 | $60\times10^3$ | 1.8 | $7\times10^4$ | 800 |
| 21 | 45 | 53 | 2 | $70\times10^3$ | 0.5 | $20\times10^4$ | 1500 |
| 22 | 45 | 50 | 5 | $72\times10^3$ | 0.4 | $28\times10^4$ | 1600 |
| 23 | 45 | 45 | 10 | $70\times10^3$ | 0.4 | $21\times10^4$ | 1700 |
| 24 | 45 | 40 | 15 | $63\times10^3$ | 0.8 | $10\times10^4$ | 1260 |
| 25 | 34 | 64 | 2 | $70\times10^3$ | 0.45 | $15\times10^4$ | 1340 |
| 26 | 32 | 58 | 10 | $68\times10^3$ | 0.4 | $17\times10^4$ | 1400 |
| 27 | 28 | 66 | 6 | $65\times10^3$ | 0.6 | $10\times10^4$ | 1100 |
| 28 | 38 | 57 | 5 | $70\times10^3$ | 0.4 | $20\times10^4$ | 1600 |
| 29 | 48 | 40 | 2 | $71\times10^3$ | 0.55 | $18\times10^4$ | 1540 |
| 30 | 53 | 37 | 10 | $69\times10^3$ | 0.55 | $16\times10^4$ | 1300 |
| 31 | 61 | 34 | 5 | $73\times10^3$ | 2.5 | 5000 | 400 |
| 32 | 50 | 50 | 0 | $70\times10^3$ | 7.5 | 600 | 160 |

EXAMPLE 3

Various compositions containing strontium titanate, niobium oxide and germanium dioxide prepared in the composition ratio shown in table 3. These samples were treated with diffusion agents containing PbO, $Bi_2O_3$ and $B_2O_3$ and having the composition ratios stated in Table 3. They were then subjected to almost the same treatment as in Example 2 to obtain capacitor samples. The electrical properties of these capacitors are also stated in Table 3.

1,480°C for 3 hours in a slightly reducing atmosphere of 99% nitrogen and 1% hydrogen to obtain a semicon- Table 3

| Sample No. | Weight ratio of each component (%) | | | Weight ratio(%) PbO-Bi₂O₃-B₂O₃ | ε | Electric properties | | Breakdown voltage (V/mm) |
|---|---|---|---|---|---|---|---|---|
| | SrTiO₃ | Nb₂O₅ | GeO₂ | | | Tanδ (%) | Insulation resistance (MΩ.cm) | |
| 33 | 90.68 | 5.32 | 4.00 | 34-64-2 | 54×10³ | 0.45 | 25×10⁴ | 1700 |
| 34 | " | " | " | 53-37-10 | 53×10³ | 0.55 | 21×10⁴ | 1600 |
| 35 | 95.93 | 0.07 | 4.00 | 34-64-2 | 55×10³ | 0.40 | 20×10⁴ | 1500 |
| 36 | " | " | " | 53-37-10 | 54×10³ | 0.40 | 17×10⁴ | 1420 |
| 37 | 98.03 | 1.47 | 0.50 | 34-64-2 | 67×10³ | 0.50 | 24×10⁴ | 1600 |
| 38 | " | " | " | 53-37-10 | 65×10³ | 0.55 | 20×10⁴ | 1500 |
| 39 | 97.47 | 0.53 | 2.00 | 34-64-2 | 67×10³ | 0.50 | 24×10⁴ | 1500 |
| 40 | " | " | " | 53-37-10 | 64×10³ | 0.50 | 22×10⁴ | 1400 |
| 41 | 99.88 | 0.07 | 0.05 | 34-64-2 | 59×10³ | 0.50 | 16×10⁴ | 1400 |
| 42 | " | " | " | 53-37-10 | 58×10³ | 0.50 | 17×10⁴ | 1400 |

As shown in Tables 2 and 3, it is possible to improve the electrical properties by using a diffusion agent containing lead oxide, bismuth oxide, and boric oxide as compared with using bismuth oxide alone.

As shown in the foregoing tables, sample numbers 18, 21–23, 25, 26, 28–30, 33–42 had loss factors of from 0.35 to 0.55%, effective dielectric constants from 53,000 to 72,000, insulation resistances of 150,000 to 350,000 megohm centimeters, and a breakdown voltage of from 1300 to 1800 volts per millimeter.

Samples numbers 19, 20, 25, 27, 31 and 32 have improved dielectric constants, but are inferior in other electric properties because of the ratios of lead oxide, bismuth oxide, and boric oxide. Accordingly, the most favorable composition ratio for the diffusant diffusing into a strontium titanate-niobium oxide-germanium oxide semiconductor is as follows:

PbO         32 to 53 weight %
Bi₂O₃       37 to 64 weight %
B₂O₃        2 to 10 weight %

EXAMPLE 4

Powdered strontium titanate, tantalum oxide and germanium oxide were combined in ratios indicated in Table 4, mixed and pulverized in accordance with known ceramic manufacturing methods. They were combined with a known binder such as polyvinyl alcohol and molded by pressing to obtain samples in disc form. Each of the samples was sintered at 1,350° to 1,480°C for 3 hours in a slightly reducing atmosphere of 99% nitrogen and 1% hydrogen to obtain a semiconductor disc of about 8 millimeters in diameter and 0.4 millimeters in thickness. Each was coated with three milligrams of bismuth oxide powder as a diffusing agent and sintered at 1,300°C for 2 hours in an oxidizing atmosphere so as to diffuse the agent into the grain boundaries of the sample and provide intergranular insulation. Thereafter, silver electrodes were attached by baking them onto the opposite surfaces of the sample to obtain a capacitor.

The electrical properties of such capacitors are also shown in Table 4. The dielectric constant and the loss factor wee measured in terms of 1 kilohertz, the insulation resistance value was that obtained after 1 minute after an application of a direct current voltage of 50 volts, and the dielectric breakdown voltage was measured with a direct current voltage.

Table 4

| Sample No. | Weight ratio of each component (%) | | | ε | Electric properties | | Breakdown voltage (V/mm) |
|---|---|---|---|---|---|---|---|
| | SrTiO₃ | Ta₂O₅ | GeO₂ | | tan δ (%) | Insulation resistance (MΩ.cm) | |
| 1 | 91.92 | 4.08 | 4.00 | 50×10³ | 0.8 | 13×10⁴ | 1400 |
| 2 | 95.67 | 0.33 | 4.00 | 55×10³ | 0.8 | 18×10⁴ | 1500 |
| 3 | 99.62 | 0.33 | 0.05 | 59×10³ | 0.7 | 17×10⁴ | 1500 |
| 4 | 95.87 | 4.08 | 0.05 | 52×10³ | 0.7 | 18×10⁴ | 1400 |
| 5 | 94.19 | 2.01 | 3.80 | 57×10³ | 0.7 | 16×10⁴ | 1200 |
| 6 | 97.55 | 0.40 | 2.05 | 59×10³ | 0.7 | 17×10⁴ | 1500 |
| 7 | 97.40 | 2.50 | 0.10 | 60×10³ | 0.7 | 16×10⁴ | 1400 |
| 8 | 96.42 | 1.58 | 2.00 | 61×10³ | 0.8 | 15×10⁴ | 1300 |
| 9 | 96.44 | 0.56 | 3.00 | 61×10³ | 0.7 | 16×10⁴ | 1300 |
| 10 | 91.58 | 4.42 | 4.00 | 30×10³ | 1.4 | 8×10⁴ | 800 |
| 11 | 93.00 | 2.00 | 5.00 | 32×10³ | 1.2 | 10×10⁴ | 900 |
| 12 | 97.74 | 0.11 | 2.15 | 39×10³ | 0.7 | 16×10⁴ | 1100 |
| 13 | 94.87 | 0.33 | 4.80 | 38×10³ | 1.2 | 16×10⁴ | 1300 |
| 14 | 98.09 | 1.89 | 0.02 | 40×10³ | 0.7 | 16×10⁴ | 1400 |
| 15 | 99.73 | 0.22 | 0.05 | 39×10³ | 0.7 | 15×10⁴ | 1200 |
| 16 | 91.90 | 5.00 | 3.10 | 31×10³ | 0.8 | 30×10⁴ | 1600 |
| 17 | 95.90 | 4.08 | 0.02 | 35×10³ | 1.3 | 18×10⁴ | 1300 |

It will be seen in Table 4 that samples 1 to 4 each exhibited properties such that the loss factor was below 0.8%, of the effective dielectric constant was 50,000 to 61,000, the insulation resistance was 150,000 to 180,000 megohm centimeters, and the breakdown voltage was 1200 to 1500 volts per millimeter. The dielectric capacity change rate due to temperature change was in the range of plus or minus 13%, as shown in the drawing.

It is clear from the foregoing that the loss factor value was improved very much as compared with that of an intergranular type capacitor comprising conventional strontium titanate. In addition, the dielectric constant is increased from 1.7 to two times, and is near that obtained from using conventional barium titanate semiconductors.

The samples numbered 10 to 17, however, are not as favorable because of their relatively low dielectric constant. Accordingly, the preferred composition where strontium titanate is combined with tantalum oxide and germanium oxide is as follows:

| | |
|---|---|
| $SrTiO_3$ | 91.92 to 99.62 weight % |
| $Ta_2O_5$ | 0.33 to 4.08 weight % |
| $GeO_2$ | 0.05 to 4.00 weight % | treated with three milligrams of diffusion agents comprising PbO, $Bi_2O_3$ and $B_2O_3$ having the compositions listed in Table 5. Each sample was sintered at 1,100°C for 2 hours in an oxidizing atmosphere so as to diffuse the agents into the grain boundaries thereby forming intergranular insulation. Silver electrodes were attached by baking them to opposite main surfaces of each sample to provide a capacitor. The electrical properties of such capacitors are also recited in Table 5.

Table 5

| Sample No | Weight ratio of each component (%) | | | $\epsilon$ | $\tan\delta$(%) | Electric properties Insulation resistance (MΩ.cm) | Breakdown voltage (V/mm) |
|---|---|---|---|---|---|---|---|
| | PbO | $Bi_2O_3$ | $B_2O_3$ | | | | |
| 18 | 54 | 41 | 5 | $68\times10^3$ | 0.35 | $21\times10^4$ | 1400 |
| 19 | 5 | 95 | 0 | $60\times10^3$ | 1.3 | $14\times10^4$ | 1200 |
| 20 | 45 | 54 | 1 | $70\times10^3$ | 2.0 | $2\times10^4$ | 400 |
| 21 | 45 | 53 | 2 | $68\times10^3$ | 0.5 | $17\times10^4$ | 1400 |
| 22 | 45 | 50 | 5 | $67\times10^3$ | 0.3 | $21\times10^4$ | 1600 |
| 23 | 45 | 45 | 10 | $63\times10^3$ | 0.35 | $20\times10^4$ | 1500 |
| 24 | 45 | 40 | 15 | $55\times10^3$ | 0.4 | $10\times10^4$ | 900 |
| 25 | 35 | 63 | 2 | $64\times10^3$ | 0.5 | $17\times10^4$ | 1400 |
| 26 | 27 | 63 | 10 | $63\times10^3$ | 0.45 | $16\times10^4$ | 1300 |
| 27 | 26 | 69 | 5 | $50\times10^3$ | 0.6 | $8\times10^4$ | 600 |
| 28 | 35 | 60 | 5 | $66\times10^3$ | 0.45 | $20\times10^4$ | 1700 |
| 29 | 58 | 40 | 2 | $62\times10^3$ | 0.45 | $17\times10^4$ | 1500 |
| 30 | 56 | 34 | 10 | $61\times10^3$ | 0.65 | $18\times10^4$ | 1500 |
| 31 | 64 | 30 | 6 | $60\times10^3$ | 3.4 | 350 | 400 |
| 32 | 50 | 50 | 0 | $65\times10^3$ | 6.8 | 200 | 300 |

It is believed that the $Ta_2O_5$ replaces the atoms of $SrTiO_3$ crystals to make $SrTiO_3$ semiconductive and form a valency control type semiconductor. $GeO_2$ exists mainly in the grain boundary layer and has a tendency to increase the crystal grain size or diameter of the semiconductive crystals. During the secondary sintering for diffusion, the diffusants combined with the germanium oxide already existing in the grain boundaries and thereby form a uniform insulation layer having small pin holes. It is relatively easy to obain a uniform insulation layer in this way and therefore, the insulation resistance value and the loss factor can be favorable even when the layer is very thin.

EXAMPLE 5

A composition was made up comprising:

| | |
|---|---|
| Strontium titanate | 96.42 weight % |
| tantalum oxide | 1.58 weight % |
| germanium dioxide | 2.00 weight % |

This composition was processed as in example 4 to produce a ceramic semiconductor material. Each was

EXAMPLE 6

Compositions comprising strontium titanate, tantalum oxide and germanium dioxide were prepared with the proportions indicated in Table 6 to obtain ceramic semiconductor samples. These samples were treated with diffusion agents comprising lead oxide, bismuth oxide and boron oxide in the percentages indicated in Table 6. The treated samples were then formed into capacitors. The electrical properties of such capacitors are also stated in Table 6.

Table 6

| Sample No. | Weight ratio of each component (%) | | | Weight ratio(%) | Electric Properties | | | Breakdown voltage (V/mm) |
|---|---|---|---|---|---|---|---|---|
| | $SrTiO_3$ | $Ta_2O_5$ | $GeO_2$ | $PbO-Bi_2O_3-B_2O_3$ | $\epsilon$ | $\tan\delta$ (%) | Insulation resistance (MΩ.cm) | |
| 33 | 91.92 | 4.08 | 4.00 | 35-63-2 | $53\times10^3$ | 0.45 | $16\times10^4$ | 1400 |
| 34 | " | " | " | 56-34-10 | $52\times10^3$ | 0.55 | $17\times10^4$ | 1500 |
| 35 | 95.67 | 0.33 | 4.00 | 35-63-2 | $57\times10^3$ | 0.40 | $19\times10^4$ | 1500 |
| 36 | " | " | " | 56-34-10 | $56\times10^3$ | 0.70 | $20\times10^4$ | 1600 |
| 37 | 97.55 | 0.40 | 2.05 | 35-63-2 | $61\times10^3$ | 0.35 | $20\times10^4$ | 1600 |
| 38 | " | " | " | 56-34-10 | $60\times10^3$ | 0.60 | $20\times10^4$ | 1660 |
| 39 | 97.40 | 2.50 | 0.10 | 35-63-2 | $64\times10^3$ | 0.40 | $16.5\times10^4$ | 1500 |
| 40 | " | " | " | 56-34-10 | $62\times10^3$ | 0.60 | $17\times10^4$ | 1400 |
| 41 | 99.62 | 0.33 | 0.05 | 35-63-2 | $61\times10^3$ | 0.45 | $17\times10^4$ | 1500 |
| 42 | " | " | " | 56-34-10 | $59\times10^3$ | 0.50 | $19\times10^4$ | 1500 |

From samples numbers 18, 21–23, 25, 56, 28–29 and 33–42, the loss factor is in the range of 0.3 to 0.7, the effective dielectric constant is 52,000 to 68,000, the insulation resistance is 160,000 to 210,000 megohm centimeters, and the breakdown voltage is 1200 to 1700 volts per millimeter.

As to samples numbers 19, 20, 24, 27, 31 and 32, they have an improved dielectric constant, but are somewhat inferior in other properties. Accordingly, the preferred composition for diffusion into a strontium titanate-tantalum oxide-germanium dioxide semiconductor is as follows:

| | |
|---|---|
| PbO | 27 to 58 weight % |
| $Bi_2O_3$ | 34 to 63 weight % |
| $B_2O_3$ | 2 to 10 weight % |

EXAMPLE 7

Powders of strontium titanate, niobium oxide and zinc oxide were combined in the ratios shown in Table 7. They were mixed and pulverized in accordance with known ceramic manufacturing methods, and combined with binders such as polyvinyl alcohol. After molding to form a disc, each of these samples were sintered at 1,350°–1,480°C for 3 hours in a slightly reducing atmosphere of 99% nitrogen and 1% hydrogen to obtain discs of about 8 millimeters in diameter and 0.4 millimeters in thickness. Each of the ceramic semiconductors were treated with three milligrams of bismuth powder as a diffusing agent, followed by sintering at 1,300°C for 2 hours in an oxidizing atmosphere so as to diffuse the agent into the grain boundaries of the sample. Silver electrodes were applied to provide a capacitor. The electrical properties of the capacitors are set forth in table 7. These tests were made under the same conditions as previously noted tests.

It will be seen that samples numbers 1 to 9 have loss factors below 0.9%, an effective dielectric constant of from 50,000 to 62,000, and insulation resistance of 90,000 to 140,000 megohm centimeters, and a breakdown voltage of 1,000 to 1,400 volts per millimeter. The dielectric capacity change rate temperature varied in the range from about plus or minus 15% as shown in the drawing.

From the foregoing, it will be seen that the loss value is improved very much as compared with that of an intergranular insulation type capacitor of strontium titanate, and the dielectric constant is increased to 1.8 to 2 times and approximates that obtained by using conventional barium titanate series semiconductors.

Samples 10 to 17, however, are not particularly favorable because of their relatively low dielectric constant. Accordingly, the semiconductor compositions of the present invention when employing niobium oxide in combination with zinc oxide should preferably have the following ranges:

| | |
|---|---|
| $SrTiO_3$ | 91.18 to 99.82 weight % |
| $Nb_2O_5$ | 0.13 to 5.32 weight % |
| ZnO | 0.05 to 3.5 weight % |

Table 7

| Sample No | Weight ratio of each component (%) | | | $\epsilon$ | tan$\delta$ (%) | Electric properties Insulation resistance (MΩ.cm) | Breakdown voltage (V/mm) |
|---|---|---|---|---|---|---|---|
| | $SrTiO_3$ | $Nb_2O_5$ | ZnO | | | | |
| 1 | 91.18 | 5.32 | 3.50 | $50 \times 10^3$ | 0.9 | $10 \times 10^4$ | 1200 |
| 2 | 94.63 | 5.32 | 0.05 | $51 \times 10^3$ | 0.85 | $10 \times 10^4$ | 1160 |
| 3 | 99.82 | 0.13 | 0.05 | $53 \times 10^3$ | 0.9 | $14 \times 10^4$ | 1400 |
| 4 | 96.37 | 0.13 | 3.50 | $51 \times 10^3$ | 0.7 | $12 \times 10^4$ | 1300 |
| 5 | 94.49 | 2.51 | 3.00 | $51 \times 10^3$ | 0.8 | $10 \times 10^4$ | 1100 |
| 6 | 98.20 | 0.50 | 1.30 | $59 \times 10^3$ | 0.8 | $9 \times 10^4$ | 1000 |
| 7 | 97.35 | 2.50 | 0.15 | $62 \times 10^3$ | 0.8 | $9 \times 10^4$ | 1000 |
| 8 | 98.45 | 1.05 | 0.50 | $61 \times 10^3$ | 0.8 | $9 \times 10^4$ | 1100 |
| 9 | 93.40 | 4.60 | 2.00 | $50 \times 10^3$ | 0.9 | $10 \times 10^4$ | 1100 |
| 10 | 90.12 | 6.38 | 3.50 | $35 \times 10^3$ | 0.8 | $10 \times 10^4$ | 1200 |
| 11 | 92.85 | 2.65 | 4.50 | $38 \times 10^3$ | 1.2 | $4 \times 10^4$ | 700 |
| 12 | 98.30 | 0.05 | 1.65 | $42 \times 10^3$ | 0.8 | $9 \times 10^4$ | 1100 |
| 13 | 95.87 | 0.13 | 4.00 | $39 \times 10^3$ | 1.7 | $6 \times 10^4$ | 600 |
| 14 | 97.49 | 2.50 | 0.01 | $43 \times 10^3$ | 1.2 | $13 \times 10^4$ | 1300 |
| 15 | 99.90 | 0.05 | 0.05 | $42 \times 10^3$ | 0.9 | $12 \times 10^4$ | 1000 |
| 16 | 91.20 | 6.50 | 2.30 | $34 \times 10^3$ | 0.8 | $12 \times 10^4$ | 1200 |
| 17 | 94.66 | 5.32 | 0.02 | $40 \times 10^3$ | 1.0 | $9 \times 10^4$ | 1000 |

EXAMPLE 8

A composition was made up with the following analysis:

| | |
|---|---|
| Strontium titanate | 94.49 weight % |
| niobium oxide | 2.51 weight % |
| zinc oxide | 3.00 weight % |

This material was treated as example 7 to obtain semiconductor materials. Three milligrams of diffusion agents comprising PbO, $Bi_2O_3$ and $B_2O_3$ in the proportions indicated in Table 8 were diffused into the samples by sintering at 1,100°C for 2 hours in an oxidizing atmosphere. Silver electrodes were attached to provide capacitors and the electrical properties of such capacitors are also recited in Table 8.

Table 8

| Sample No. | Weight ratio of each component (%) | | | $\epsilon$ | tan$\delta$ (%) | Electric properties Insulation resistance (MΩ.cm) | Breakdown voltage (V/mm) |
|---|---|---|---|---|---|---|---|
| | PbO | $Bi_2O_3$ | $B_2O_3$ | | | | |
| 18 | 55 | 40 | 5 | $61 \times 10^3$ | 0.6 | $18 \times 10^4$ | 1500 |
| 19 | 45 | 54 | 1 | $62 \times 10^3$ | 2.5 | $0.5 \times 10^4$ | 300 |
| 20 | 45 | 53 | 2 | $62 \times 10^3$ | 0.7 | $12 \times 10^4$ | 1100 |
| 21 | 45 | 50 | 5 | $61 \times 10^3$ | 0.3 | $25 \times 10^4$ | 1600 |
| 22 | 45 | 45 | 10 | $55 \times 10^3$ | 0.3 | $16 \times 10^4$ | 1200 |
| 23 | 45 | 40 | 15 | $45 \times 10^3$ | 0.4 | $10 \times 10^4$ | 1160 |
| 24 | 29 | 69 | 2 | $55 \times 10^3$ | 0.8 | $10 \times 10^4$ | 1100 |
| 25 | 29 | 61 | 10 | $51 \times 10^3$ | 0.5 | $12 \times 10^4$ | 1300 |
| 26 | 23 | 71 | 6 | $45 \times 10^3$ | 0.7 | $8 \times 10^4$ | 1200 |
| 27 | 35 | 60 | 5 | $53 \times 10^3$ | 0.6 | $12 \times 10^4$ | 1200 |
| 28 | 63 | 35 | 2 | $59 \times 10^3$ | 0.8 | $9.5 \times 10^4$ | 1200 |
| 29 | 55 | 35 | 10 | $57 \times 10^3$ | 0.5 | $11 \times 10^4$ | 1160 |
| 30 | 65 | 30 | 5 | $60 \times 10^3$ | 1.2 | $1 \times 10^4$ | 800 |

EXAMPLE 9

Compositions comprising strontium titanate, niobium oxide and zinc oxide were made up as shown in Table 9 and prepared as described in connection with Examples 7 and 8. These samples were treated with diffusion agents comprising PbO, $Bi_2O_3$ and $B_2O_3$, having the compositions shown in Table 9. Each sample was made up into a capacitor and the electrical properties of such capacitors were measured and recorded in Table 9.

Table 9

| Sample No. | Weight ratio of each component (%) | | | Weight ratio (%) | Electric Properties | | | |
|---|---|---|---|---|---|---|---|---|
| | $SrTiO_3$ | $Nb_2O_5$ | ZnO | $PbO-Bi_2O_3-B_2O_3$ | $\epsilon$ | tan$\delta$ (%) | Insulation resistance (MΩcm) | Breakdown voltage (V/mm) |
| 31 | 91.18 | 5.32 | 3.50 | 29–61–10 | 51×10³ | 0.7 | 13×10⁴ | 1260 |
| 32 | '' | '' | '' | 63–35–2 | 53×10³ | 0.7 | 13×10⁴ | 1360 |
| 33 | 94.63 | 5.32 | 0.05 | 29–61–10 | 53×10³ | 0.5 | 14×10⁴ | 1300 |
| 34 | '' | '' | '' | 63–35–2 | 55×10³ | 0.5 | 13×10⁴ | 1240 |
| 35 | 97.35 | 2.50 | 0.15 | 29–61–10 | 60×10³ | 0.5 | 15×10⁴ | 1100 |
| 36 | '' | '' | '' | 63–35–2 | 83×10³ | 0.6 | 15×10⁴ | 1080 |
| 37 | 98.20 | 0.50 | 1.30 | 29–61–10 | 56×10³ | 0.65 | 16×10⁴ | 1340 |
| 38 | '' | '' | '' | 63–35–2 | 58×10³ | 0.65 | 15×10⁴ | 1400 |
| 39 | 99.82 | 0.13 | 0.05 | 29–61–10 | 54×10³ | 0.7 | 15×10⁴ | 1400 |
| 40 | '' | '' | '' | 63–35–2 | 55×10³ | 0.8 | 14×10⁴ | 1400 |

As indicated in the table, samples numbers 18, 20–22, 24, and 25, 27–29 and 31–40 had loss factors in the range of 0.3 to 0.8%. The effective dielectric constant was 51,000 to 63,000, the insulation resistance was 95,000 to 180,000 megohm centimeters, and the breakdown voltage was 1100 to 1400 volts per millimeter.

Samples Nos. 19, 23, 26 and 30 were improved as far as dielectric constant was concerned, but were inferior in some other electrical properties. Accordingly, the preferred composition ratio of $PbO-Bi_2O_3-B_2O_3$ where the strontium titanate is combined with niobium oxide and zinc oxide is as follows:

| PbO | 29 to 63 weight % |
|---|---|
| $Bi_2O_3$ | 35 to 69 weight % |
| $B_2O_3$ | 2 to 10 weight % |

The combination of PbO, $Bi_2O_3$, and $B_2O_3$ can be diffused into the semiconductor at lower temperatures than $Bi_2O_3$ alone. The composition may be produced by heating the mixture of the components to about 1,000°C until it becomes glassy, and it is then crushed into powder. Alternatively, it may be mixed with an organic solvent to provide a paste.

The ceramic semiconductor compositions of strontium titanate described herein have excellent electrical properties, small changes of capacitance in relation to temperature, and improved loss factors.

We claim as our invention:

1. An intergranular insulation type semiconductive ceramic composition comprising from 90.68 to 99.88% by weight of polycrystalline $SrTiO_3$, from 0.07 to 5.32% by weight of either $Nb_2O_5$ or $Ta_2O_5$, from 0.05 to 4.00% by weight of either $GeO_2$ or ZnO, and having diffused therein either $Bi_2O_3$ or a mixture of $Bi_2O_3$, PbO, and $B_2O_3$, the diffused material providing a substantially uniform insulating layer about the grain boundaries of the polycrystalline $SrTiO_3$.

2. The composition of claim 1, which contains from 90.68 to 99.88 percent by weight $SrTiO_2$, from 0.07 to 5.32 percent by weight $Nb_2O_5$, from 0.05 to 4.00 percent by weight $GeO_2$ and the diffused oxides contain 32 to 53 weight percent PbO, 37 to 64 weight percent $Bi_2O_3$ and 2 to 10 weight percent $B_2O_3$.

3. The composition of claim 1, which contains from 91.92 to 99.62 percent by weight $SrTiO_3$, from 0.33 to 4.08 percent by weight $Ta_2O_5$, from 0.05 to 4.00 percent by weight $GeO_2$ and the diffused oxides contain from 17 to 58 weight percent PbO, from 34 to 63 weight percent $Bi_2O_3$ and 2 to 10 weight percent $B_2O_3$.

4. The composition of claim 1, which contains from 91.18 to 99.82 percent by weight $SrTiO_3$, from 0.13 to 5.32 percent by weight $Nb_2O_5$, from 0.05 to 3.5 weight percent ZnO and the diffused oxides contain from 29 to 63 weight percent PbO, 35 to 65 weight percent $Bi_2O_3$ and 2 to 10 weight percent $B_2O_3$.

5. A method of making an intergranular insulation type semiconductor ceramic composition which comprises mixing a major amount of $SrTiO_3$ with a minor amount of $Nb_2O_5$ or $Ta_2O_5$ and a minor amount of $GeO_2$ or ZnO, molding the resulting mixture and sintering the same in a slightly reducing atmosphere to produce a polycrystalline ceramic, and thereafter diffusing therein $Bi_2O_3$ or a mixture of $Bi_2O_3$, PbO, and $B_2O_3$ to insulate the grain boundaries of said ceramic.

* * * * *